3,384,474
REDUCTION OF IRON ORE
John E. Idenden, Belleville, N.J., assignor to Esso Research and Engineering Company, a corporation of Delaware
Filed Mar. 3, 1966, Ser. No. 531,407
9 Claims. (Cl. 75—26)

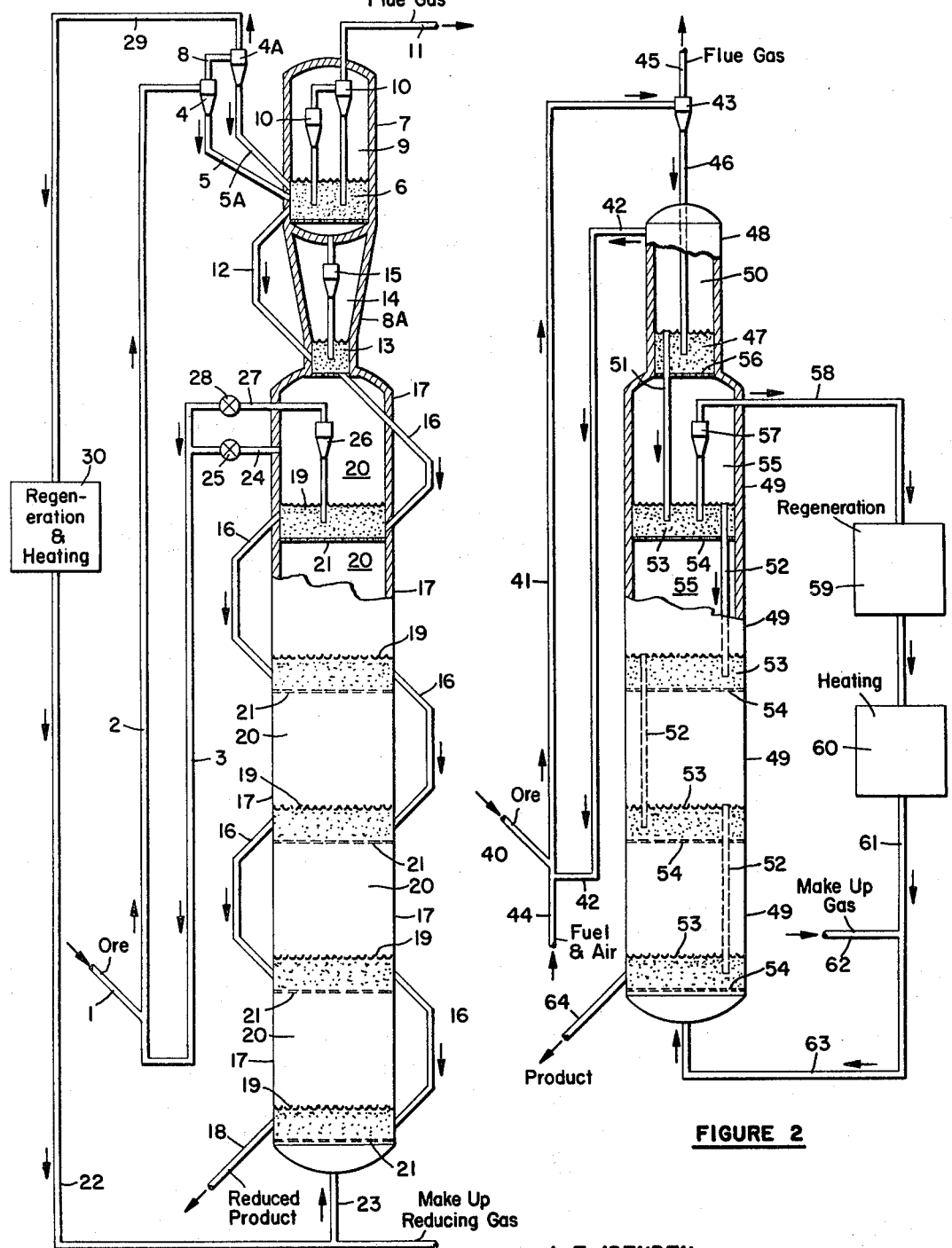

This invention relates to the production of metallic iron by the reduction of iron ores by contact with reducing gases. More particularly, it involves the introduction of oxidic ores into a fluidized iron ore reduction process, followed by the preheating, treating, and reduction of the ore.

Direct reduction of iron ores by treatment with reducing gases is known. It is thus well known to reduce iron ores with reducing gases, especially in fluidized beds. Generally, such processes are carried out by introducing ore into the top stage of a series of staged fluidized beds. The ore descends downwardly through the series of beds, from one bed to the next. The ore is reduced, at temperatures ranging from about 1000° F. to just below the sintering temperature of the ore (usually about 1800° F.), by sequentially countercurrently contacting the beds with ascending reducing gas which is introduced at a lower stage of the series. Components of the reducing gas are oxidized while simultaneously the oxidation level of the ore is progressively lowered. A product comprising substantially metallic iron is removed from a lower stage. The partially oxidized reducing gas is withdrawn from the top stage and is generally regenerated by removing oxidized components, and then the regenerated gas is recycled to the reduction stages. Such reduction processes are often carried out in a single reactor which houses the series of staged beds though a similar function could be served by use of a plurality of reaction vessels. The reactors can be operated at atmospheric pressure or superatmospheric pressure.

Ore is ordinarily carried to the top bed of a reduction reactor by mechanical means, e.g., bucket elevators. The use of such means involves a considerable financial investment and introduces various problems. This will be appreciated when it is realize dthat ore reduction reactors often range to heights of 200 feet, and even higher. The feed facility must thus also be of considerable height. Moreover, a considerable amount of space is required for a bucket elevator installation, and the facility itself is subject to various mechanical problems requiring high maintenance expense and unit downtime. Furthermore, bucket elevators lack flexibility in the choice of operable feed rates. Even worse, only cold ore feed can be introduced to the reactor by means of bucket elevators, this resulting in low reduction efficiencies in the upper bed. Also, the introduction of cold ore into a high temperature fluidized bed causes heat shock which results in decrepitation of the ore and the production of large quantities of fines, much of which are entrained in the reducing gases. Such entrainment not only constitutes lost product but also presents difficulties in handling the recycle gas since the fines must be removed before recompression of the gas to avoid damage to the compressor facilities. Heat shock also renders some ores less reducible than they would otherwise have been if heated gradually.

Still another problem encountered in the conventional reduction process is that the sensible heat in the partially oxidized reducing gas is wasted; thus, it is necessary to cool the recycle gas in order to regenerate it. Handling the hot gases prior to cooling also presents problems. For example, the recycle process equipment is easily fouled by entrained ore particles when the gas is at high temperatures whereas fouling is minimized when the recycle gas is handled at lower temperatures. Even worse, if the recycle reducing gas contains carbon monoxide, a very serious problem is introduced when the gas is brought into contact with the metallic surfaces of the recycle process equipment at temperatures in the range of about 900° F. to 1200° F. This problem results from the reversion of carbon monoxide, according to the reaction $$2CO \rightarrow C + CO_2.$$

Thus a highly reactive species of free carbon is liberated by this reaction, which at best tends to foul the equipment and at worst leads to the occurrence of the dread phenomenon of catastrophic carburization. This phenomenon occurs when carbon reacts at high temperatures with the iron in the process equipment, this causing rapid corrosion and weakening the iron surfaces. Thus, such reaction not only leads to additional maintenance expenses but can often create safety hazards when high pressure equipment is attacked.

Considerable thought has been given to ways in which the foregoing difficulties might be overcome. It was thought that one way to eliminate bucket elevators may be to use a disperse phase gas lift to introduce feed to the reactor. In such methods particulate iron ore feed may be dispersed in a high velocity stream of gas and transported or "lifted" to the top of the reactor through a riser, i.e., a vertical line. This, however, creates major problems. For example, it would be necessary to use high capacity compressors to deliver the large quantities of lift gas required. Moreover, large quantities of additional reducing gas would have to be used in the lift. Alternately, if a gas other than reducing gas were used, it would be necessary to provide separate handling facilities to avoid diluting the reactor reducing gases with the lift gas. Thus, were one to attempt to use an extraneous gas to lift the ore to the top of the reduction reactor, such gas would have to be separated from the ore prior to or at the time of introduction of the ore into the reactor to avoid dilution or contamination of the reducing gas with the extraneous gas. Further, the compressor facilities would have to be capable of delivering the large quantities of lift gas at high pressures when the preferred high pressure reduction conditions were employed, this further increasing the compressor installation cost. Furthermore, the use of such a gas lift system would offer no solution to the inefficiencies and difficulties resulting from the feeding of cold ore, e.g., the wasting of the sensible heat of the recycle gas or the causing of ore decrepitation. Nor does such method present any means of alleviating the undesirable effects of carbon monoxide in the recycle gas at high temperatures.

The alleviation or solution of these and other prior art difficulties encountered in a fluidized iron ore reduction process is the prime objective of the present invention.

This invention contemplates introducing particulate iron ore feed into a circulatory stream of lift gas supplied from within the reactor to form an iron ore gas-solids disperse phase. The stream of gas is taken from a high pressure disperse phase zone above a fluid bed of the reactor and injected into a lower pressure zone. Preferably the lower pressure zone includes gas-solids separatory means adjacent a treating or reduction zone of the process. The lift gas, i.e., the ascending circulatory stream of gas, carries the particulate ore feed to separatory means preferably located just above the top or initial bed of the reactor.

The separatory means, e.g., a cyclone separator, is operated at a lower pressure than the zone which provides the source of the circulatory gas, i.e., the high pressure disperse phase zone. This enables the ascending gas to lift the particulate ore through the circulatory system without using an external source of power, e.g., a pump or compressor. The ore particles are separated from the gas in the separatory means and are passed downwardly as a descending column of ore, as, for example, in a standpipe, which extends from the separator into the top or initial bed of a series.

Since the high pressure disperse phase zone from which the gas is taken is at a greater pressure than the separatory means the required pressure differential therebetween will determine the equilibrium height of the ore column in the standpipe. Thus, the maximum pressure drop through the circulatory system will be limited to the pressure head of the ore column in a completely filled standpipe.

From the initial fluidized bed the ore descends to the next bed and through the series of beds of the reactor, the ore of the beds being fluidized and progressively reduced substantially to metallic iron by countercurrent contact with ascending reducing gas. Lift gas for transport of the ore is supplied by the ascending reducing gas. The lift gas is continuously withdrawn from one or more of the disperse phase zones above the fluidized beds and then passed into the ascending circulatory stream.

A feature of the invention is that the circulatory gas can be continuously regenerated and reused in the process. Preferably the circulatory gas, after separation from the ore feed, is regenerated by removing oxidized components, e.g., water or carbon dioxide, or both, and the regenerated gas is recycled to the lower reducing bed for further use. It can be, and generally is, added to the reactor with fresh make-up gas.

Reduction of the investment requirements by eliminating bucket elevators or other mechanical conveyors is only one of the profound advantages offered by the process of this invention. It provides other important advantages. Thus, preheated feed can be introduced to the top bed to achieve increased reduction efficiencies. This is accomplished quite advantageously by contact of the cold ore with hot lift gas introduced into the circulatory stream at temperatures ranging from about 1200° F. to about 1600° F. The overall thermal efficiency of the process is greatly improved since the sensible heat of the recycle gas is used in the preheating step. Initial reduction of the ore can increase the overall efficiency of the process, and a gradual preheating of the ore in the circulatory system may lessen decrepitation. Still another advantage is achieved by allowing or causing the circulatory gas to equilibrate in contact with the incoming ore feed; namely, the concentration of carbon monoxide is greatly reduced. Such reduction in carbon monoxide concentration results from the water gas shift reaction:

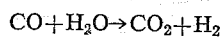

$$CO + H_2O \rightarrow CO_2 + H_2$$

which reaction shifts to the right at temperatures in the range of from about 600 to about 900° F. Thus, in a preferred embodiment of this invention the circulatory gas rate is adjusted to equilibrate in this preferred temperature range, which enriches the recycled gas in hydrogen and avoids the problems encountered in recycling gases having high carbon monoxide concentrations.

Many variations, of course, can be utilized in carrying out the process of this invention. For example, it may be desirable to use only a small part of the total reactor reducing gas in the circulatory system, or all of such gas may be used. The reducing potential and temperature of the gas can be readily varied, as desired. The amount of gas circulated depends on the ore feed rate, the desired ore preheat temperature, and the desired recycle gas temperature. Thus, e.g., to minimize decrepitation, a small fraction of the gas may be used to pick up ore feed and heat it only slightly and then additional quantities of hot gas can be injected step-wise up the circulatory line so that ore is gradually heated to temperatures approaching that of the top reactor bed.

In one embodiment of this invention the partially oxidized hot reducing gas from the top stage of a fluidized iron ore reduction reactor is withdrawn into a transfer line gas lift system which parallels the reactor. The gas introduced into the transfer line passes downwardly to an ore feed inlet generally located at ground level for convenience. The gas within the transfer line is conveyed upwardly from the feed inlet, transporting the ore to a separatory device, e.g., a cyclone separator, located generally above the top stage reduction bed. As the hot gas and ore ascend through the transfer line to the cyclone, the ore feed is heated. The cyclone separates the gas from the ore and routes it to regeneration vessels for recycle, while simultaneously the heated ore passes downwardly through a standpipe from the cyclone into the dense phase bed of the top reducing stage of the reactor. Thus, the gas above the top bed circulates downwardly to a feed inlet and upwardly to the separator picking up ore feed and carrying it to that same top bed. The driving force to circulate the gas is derived from the difference in pressure between the top stage and that of the separator. This pressure difference is maintained by the seal provided by the column of ore particles in the cyclone standpipe.

The gas circulation rate must be sufficient to carry the ore feed in disperse phase to the separatory means. The amounts of gas required to transport the ore will depend to a large extent on the ore feed rate and particle size. Generally, however, gas rates sufficient to provide a superficial linear velocity of at least about 50 feet/second will be required. Higher velocities can be used, but it will ordinarily be commercially impractical to employ gas velocities above about 150 feet/second. Gas velocities ranging from about 70 to 100 feet/second are most preferable, although it may be advantageous to vary the velocity depending on the overall iron ore-circulatory gas contact time desired for the water-gas shift reaction.

It is desirable that the ore loading of the circulatory gas stream be kept at an ore-to-gas ratio below about 2 pounds of ore per cubic foot of gas and preferably in the range of about 0.1 to 1.0 pounds/foot.³ Higher ore rates will be readily operable from the standpoint of disperse phase transport, but erosion of the cyclones tends to be a serious problem at higher rates.

The ore feed-to-circulatory gas ratio may be limited by the permissible pressure drop which can be tolerated in transporting the ore. Thus, a very high pressure drop from the gas source to the cyclone will require a relatively long cyclone standpipe to build the necessary solids head to maintain the pressure seal between the cyclone and the top stage dense bed, this requiring additional height to the reactor structure. By employing conventional solids disengaging spaces above fluidized beds ranging from about 20 to 40 feet and using a standpipe no taller than this available space, solids heads of about 12 to 24 p.s.i. are feasible. Such pressure drop is generally a sufficient driving force to transport ore feeds in disperse phase from ground level to a cyclone 200 feet high at ore loading rates of 2 pounds of ore per cubic foot of gas, well above normal loadings.

An important feature of the invention resides in the withdrawing of the circulatory gas from the disperse phase above a fluid bed without first separating the entrained ore particles from the gas. The hot particles carry sensible heat at the temperature of the zone from which they are taken, which greatly increases the degree of ore preheating possible in the circulatory line. It is feasible to entrain hot ore particles in amounts such that the total ore in the gas lift stream is within the desired operating range of loading rates. Thus, the entrained ore from the fluid bed can be as much as 0.1 to 4, or more, times the amount of feed ore introduced into the transfer line.

The entrained ore may also act as a scouring agent to remove any crusts of ore formed by the sudden drying of wet ore feeds which are on the feed inlet or the walls of the circulatory line. Alternately, by operating the circulatory gas source zone at low entrainment conditions, only a negligible amount of entrained ore will circulate with the gas, this being useful when it is not desired to heat the feed initially to high temperatures.

The invention will be more readily understood, and its flexibility better appreciated by reference to the attached drawings of which:

FIGURE 1 shows a modification of the invention wherein circulatory gas is withdrawn from an intermediate reduction stage of a multi-stage reactor and used to transport ore feed to a cyclone above a top preheating stage from which the ore passes down through the reactor to be reduced substantially to metallic iron.

FIGURE 2 shows an alternate modification of the process wherein only a small fraction of the reactor reducing gas is withdrawn into the circulatory stream for use in transporting ore feed which is heated to high temperatures in the circulatory line by burning added fuel therein.

Referring to FIGURE 1, iron ore at ambient temperature is introduced through line 1 into a stream of circulatory reducing gas in line 2, such gas being withdrawn from the reactor into line 3 at about 1350° F. The entire reactor circulatory line system is maintained at superatmospheric pressure and the ore feed can be introduced to such high pressure system by any conventional means; for example, a lock hopper can be used or a column of ore of sufficient height to build a head up to system pressure may be employed. The ore is carried, in disperse phase in the gas, up circulator line 2 to a cyclone separator 4, being heated to about 1000° F. enroute. The ore is separated from the gas and passes down standpipe 5 into the top or initial fluidized bed 6 of an ore preheating stage 7. Air and fuel are introduced (by means not shown) into bed 6 in sufficient quantities to provide additional heating or "burning" of the ore to eliminate combustible impurities. The gas stream from the cyclone separator 4 passes via line 8 to a secondary cyclone 4A where any remaining ore is separated and passed by means of standpipe 5A into the fluidized bed 6 of the pretreating stage.

Bed 6 is fluidized by ascending gases which pass into disengaging zone 9 where most large ore particles separate from the gas, through cyclone separators 10 to remove entrained fines therein, and out through flue gas line 11. Pretreated ore passes from bed 6 via standpipe 12 into the dense bed 13 of a prereduction stage 8a where part of the reducing gases ascending from lower reduction stages fluidizes and reduces $Fe_2O_3$ substantially to magnetite, $Fe_3O_4$.

The ascending gas is then passed through the disengaging zone 14 and cyclone separator 15 into the pretreating stage above. From the fluidized bed 13 of the prereduction stage the ore particles pass down by means of standpipes 16 through the various reduction stages 17 to be reduced substantially to metallic iron product which is drawn off through line 18. Each of the reduction stages comprises a fluid bed 19, disengaging space 20, and a grid 21 for dispersing the fluidizing gas. Recycled reducing gas is combined via line 22 with fresh make-up reducing gas in line 23 and introduced into the bottom reducing stage. Generally, the reducing gas is heated to temperatures of about 1400 to 1600° F. and sufficient to maintain the lower reduction stage at about 1100–1500° F. The gas ascends through the various grids 21, dense beds 19, and disengaging zones 20 up to the top reduction stage from which it passes into the circulatory line 3 by either of two routes: first, the gas may be taken directly from the disengaging zone 20 through line 24 and valve 25, and in this case entrained ore particles will be carried with the gas. Alternately, by closing valve 25 and opening valve 28 the reducing gas can be made to circulate through cyclone separator 26 and line 27 into the circulatory line 3. In this case the separator eliminates substantially all of the entrained ore from the gas. Preferably, at least about 80%, and more preferably, about 90 to 99% of the reducing gas passing through the reduction stages is routed into the circulatory line 3 with the remaining fraction passing up through the prereduction stage 8a and pretreating stage 7 to be burned and discarded. Alternately, all of the gas may be withdrawn into the circulating stream, regenerated, and recycled, a small fraction of the regenerated gas being added to the prereduction stage. In such case the prereduction stage can be completely separated from the reduction stages except for a standpipe or other means to pass solids down to the reduction stages. It is, of course, desirable that as much of the circulatory gas be recycled and reused as is feasible and this is accomplished by taking gas from the cyclone separator 4A through line 29 to regeneration and heat facilities 30 wherein the oxidized components, e.g., water and carbon dioxide, are removed by conventional means and the gases recycled via line 22 to be reused.

Referring now to FIGURE 2, ore is introduced through line 40 to the circulating gas stream in line 41. This gas is composed of a small fraction of the reactor reducing gas entering through line 42 and additional gases which are the combustion products of air and hydrocarbon fuel injected at inlet 44. Such air and fuel are added in sufficient quantities to provide a high temperature in the total gas circulating stream, e.g., 1500 to 1600° F. The circulating gas is oxidizing, and the ore is preoxidized as it is carried in disperse phase up line 41, natural magnetite being converted to the more readily reducible $Fe_2O_3$. Simultaneously, impurities such as sulfur are oxidized and removed in cyclone separator 43 with the flue gases exiting through line 45. The particular temperatures required to achieve reasonable oxidation of sulfur or magnetite, or both, will depend to a great extent on the characteristics of the ore used. Generally, however, operable temperatures are in the range of from about 1200° F. to the sintering temperature of the ore (above 1800° F. for most ores). The solid ore particles pass from the separator through standpipe 46 into the top or initial fluidized bed 47 of prereduction stage 48 where the ore is partially reduced by reducing gases ascending through the various reduction stages 49. A minor fraction of the gases from the reduction stages passes through the fluid bed 47 of the prereduction stage into the disengaging zone 50 and is then withdrawn into the circulating gas stream by means of line 42 and used to lift additional feed to the top stage cyclone 43. The prereduced ore descends from stage 48 through standpipe 51 into the series of reduction stages passing through the various beds 53 by means of standpipes 52 to be drawn off as a substantially metallic iron product at outlet 64. The ascending reducing gases pass upwardly through the various reduction stages, being dispersed by grids 54. The minor fraction, i.e., generally less than about 20%, and preferably about 1 to 10%, passes from the top reduction stage through grid 56 into the prereduction stage. The remainder passes from the top reduction stage through cyclone 57 by means of line 58 to a regeneration facility 59 to be purified for reuse. After regeneration the purified reducing gas is reheated in furnace 60, exiting through line 61, combined with new make-up reducing gas from line 62, and recycled to the bottom reduction stage via inlet 63. Alternately, all the reactor gas can be withdrawn through cyclone 57, and then a small fraction, before or after regeneration, can be passed to the prereduction stage. In this case, except for the solids standpipe, the prereduction stage may be separated from the reduction stages below.

Many modifications may be made to the invention without departing from the spirit and scope as illustrated herein. Accordingly, it is desired that the invention be limited only by the attached claims.

What is claimed is:

1. In a process for the production of metallic iron from iron ores wherein a particulate iron ore feed is introduced to a series of fluidized ore beds and progressively reduced, at temperatures ranging from about 1000° F. to about 1800° F., by passage of the ore from one bed to the next of the series of beds countercurrent to the flow of an ascending reducing gas stream introduced into a lower bed of the series, the improvement which comprises the steps of providing a circulatory stream by passing gas from a high pressure disperse phase zone, located above and contiguous to a bed, to a relatively low pressure zone, introducing iron ore feed into the circulatory stream to form an iron ore gas-solids disperse phase, transporting the iron ore gas-solids disperse phase to said low pressure zone, separating the ore from the gas, forming and passing a dense phase column of ore downwardly into an initial bed of said series of fluidized ore beds wherein the pressures range higher than that of the said low pressure zone.

2. The process of claim 1 wherein said high pressure disperse phase source is contiguous to said initial bed of the series of beds.

3. The process of claim 2 wherein ore from the fluidized bed contiguous to said high pressure circulatory gas zone is entrained in said circulatory gas in an amount ranging from about 0.1 to 4 times the amount of said ore feed introduced into the circulatory stream.

4. The process of claim 1 wherein said ores contain magnetite and about 80% to 99% of the said stream of ascending reducing gas is withdrawn below said initial bed of the series and at least partially recycled to a lower bed of the series while a residual portion of the stream passes through said initial bed partially reducing the iron ore therein and then passes into said circulatory stream, oxygen and hydrocarbon fuel being added to said stream to yield gaseous products which are oxidizing with respect to said magnetite to heat said iron ore feed to a temperature in the range of about 1200° to 1800° F. and transport said ore feed in disperse phase to said low pressure zone.

5. The process of claim 1 wherein said low pressure zone comprises a cyclone separator.

6. The process of claim 1 wherein said high pressure disperse phase source of circulatory gas is contiguous to a bed below the initial bed of said series of beds.

7. The process of claim 6 wherein said circulatory gas passes from the high pressure source at a temperature in the range of about 1200° to 1600° F. and the ore feed is introduced to said circulatory stream at a rate within the range of about 0.1 to 1.0 pound of ore per cubic foot of circulatory gas.

8. The process of claim 7 wherein after separation from the ore feed at least a major portion of the circulatory gas is regenerated to restore its reducing potential by removal of oxidation products therein and recycled to said series of fluidized beds.

9. The process of claim 8 wherein a minor portion of said ascending reducing gas remaining after separation of the circulatory gas is introduced into said initial bed of the series, hydrocarbon fuel and oxygen being added thereto to react and form additional reducing gas.

No references cited.

BENJAMIN HENKIN, *Primary Examiner.*